US010711967B2

(12) United States Patent
Liu

(10) Patent No.: US 10,711,967 B2
(45) Date of Patent: Jul. 14, 2020

(54) OPTICAL ELEMENT AND VEHICLE LAMP

(71) Applicant: Maxzone Vehicle Lighting Corp., Fontana, CA (US)

(72) Inventor: Yan-Feng Liu, Tainan (TW)

(73) Assignee: MAXZONE VEHICLE LIGHTING CORP., Fontana, CA (US)

( * ) Notice: Subject to any disclaimer, the term of this patent is extended or adjusted under 35 U.S.C. 154(b) by 253 days.

(21) Appl. No.: 15/875,709

(22) Filed: Jan. 19, 2018

(65) Prior Publication Data

US 2019/0128494 A1   May 2, 2019

(30) Foreign Application Priority Data

Nov. 1, 2017   (TW) .............................. 106216201 U

(51) Int. Cl.
| | |
|---|---|
| *F21S 41/32* | (2018.01) |
| *F21S 41/36* | (2018.01) |
| *G02B 19/00* | (2006.01) |
| *F21S 41/19* | (2018.01) |

(52) U.S. Cl.
CPC ............ *F21S 41/36* (2018.01); *F21S 41/322* (2018.01); *G02B 19/0028* (2013.01); *F21S 41/19* (2018.01)

(58) Field of Classification Search
CPC .. G02B 6/0048; G02B 6/005; G02B 19/0028; F21S 41/322; F21S 41/00; F21S 41/36; F21S 41/19; B60Q 3/64
USPC ........................................................ 362/509
See application file for complete search history.

(56) References Cited

U.S. PATENT DOCUMENTS

| | | | | |
|---|---|---|---|---|
| 6,953,271 | B2 * | 10/2005 | Aynie ................. | F21S 48/215 362/327 |
| 7,270,454 | B2 * | 9/2007 | Amano ................ | F21S 48/215 362/328 |
| 2003/0156417 | A1 | 8/2003 | Gasquet et al. | |
| 2005/0152153 | A1 | 7/2005 | Amano | |
| 2010/0027282 | A1 * | 2/2010 | Gebauer ............... | F21V 7/0091 362/487 |
| 2012/0155103 | A1 * | 6/2012 | Okada .................. | F21S 41/24 362/518 |

(Continued)

FOREIGN PATENT DOCUMENTS

| | | |
|---|---|---|
| EP | 1600908 A2 | 11/2005 |
| EP | 2835575 A2 | 2/2015 |

*Primary Examiner* — Isiaka O Akanbi
*Assistant Examiner* — Fatima N Farokhrooz
(74) *Attorney, Agent, or Firm* — Li & Cai Intellectual Property (USA) Office

(57) ABSTRACT

An optical element includes a main body and a plurality of reflection structures. Two opposite ends of the main body are defined as a light input end and a light output end. The light input end has a groove. Walls of the groove are respectively defined as a first light input wall and a second light input wall. The main body has a total reflection surface located between the light input end and the light output end. The light beams entering the main body through the second light input wall can be totally reflected by the total reflection surface. The reflection structures are disposed on the main body and correspondingly located on the total reflection surface. The light beams entering the main body through the second light input wall can be totally reflected by two adjacent reflection structures and can be mutually staggered with each other.

9 Claims, 13 Drawing Sheets

(56) References Cited

U.S. PATENT DOCUMENTS

2012/0240976 A1* 9/2012 Kuo .................. G02B 19/0061
                                                        136/246
2013/0128620 A1   5/2013 Kosuge et al.
2016/0312972 A1  10/2016 Izawa

* cited by examiner

OPTICAL ELEMENT AND VEHICLE LAMP

BACKGROUND OF THE INVENTION

1. Field of the Invention

The present disclosure relates to an optical element and a vehicle lamp; in particularly to, an optical element for a vehicle lamp and a vehicle lamp used as a head lamp.

2. Description of Related Art

Conventional vehicle lamps, especially head lamps, generally have drawbacks of emitting uneven light beams, thus indirectly affecting the driving safety of drivers. Accordingly, manufacturers of the vehicle lamps use various ways to increase uniformity of the light beams emitted from the vehicle lamps. However, the various ways described above still cannot effectively improve the aforementioned drawbacks.

In this regards, the present disclosure provides an optical element and a vehicle lamp to overcome the aforementioned drawbacks.

SUMMARY OF THE INVENTION

The main object of the present disclosure is to solve the drawbacks concerning the uneven light beams emitted from the vehicle lamps.

To resolve the above technical problems, the present disclosure provides an optical element which includes a main body and a plurality of reflection structures. Two opposite ends of the main body are respectively defined as a light input end and a light output end. The light input end has a groove recessing toward the light output end. Walls of the groove are respectively defined as a first light input wall and a second light input wall, and the second light input wall is disposed around a periphery of the first light input wall. When a light emitting unit is disposed in the groove, light beams emitted from the light emitting unit are entering the main body through the first light input wall and the second light input wall, and are emitted outwardly from the light output end of the main body. The main body has a total reflection surface located between the light input end and the light output end, the reflection structures are disposed on the main body, and the reflection structures are correspondingly located on the total reflection surface; two of the reflection structures disposed adjacent to each other are configured to totally reflect a part of the light beams, which are entering the main body through the second light input wall, so that the part of the light beams are mutually staggered with each other. The total reflection surface is configured to totally reflect the other part of the light beams, which are entering the main body through the second light input wall, so that the other part of the light beams are emitted outwardly from the light output end. The main body has a light output groove recessed on the light output end, a bottom of the light output groove is defined as a first light output portion, a portion of the light output groove surrounding the first light output portion is defined as a second light output portion, the second light output portion includes a plurality of light output structures, and each of the light output structures is in a truncated-cone shape. The first light output portion is configured to enable the light beams, which are entering the main body through the first light input wall, to be emitted outwardly. The reflection structures are configured to enable the light beams, which are entering the main body through the second light input wall, to be reflected and to be emitted outwardly from the light output structures; wherein the light beams emitted outwardly from two of the light output structures disposed adjacent to each other are mutually staggered with each other.

The present disclosure also provides a vehicle lamp which includes a light emitting unit and an optical element. The light emitting unit is capable of being controlled to emit light beams. The optical element includes a main body and a plurality of reflection structures. Two opposite ends of the main body are respectively defined as a light input end and a light output end. The light input end has a groove recessing toward the light output end. Walls of the groove are respectively defined as a first light input wall and a second light input wall, and the second light input wall is disposed around a periphery of the first light input wall. When the light emitting unit is disposed in the groove, the light beams emitted from the light emitting unit are entering the main body through the first light input wall and the second light input wall, and are emitted outwardly from the light output end of the main body. The main body has a total reflection surface located between the light input end and the light output end, the reflection structures are disposed on the main body, and the reflection structures are correspondingly located on the total reflection surface; two of the reflection structures disposed adjacent to each other are configured to totally reflect a part of the light beams, which are entering the main body through the second light input wall, so that the part of the light beams are mutually staggered with each other. The total reflection surface is configured to totally reflect the other part of the light beams, which are entering the main body through the second light input wall, so that the other part of the light beams are emitted outwardly from the light output end. The main body has a light output groove recessed on the light output end, a bottom of the light output groove is defined as a first light output portion, a portion of the light output groove surrounding the first light output portion is defined as a second light output portion, the second light output portion includes a plurality of light output structures, and each of the light output structures is in a truncated-cone shape. The first light output portion is configured to enable the light beams, which are entering the main body through the first light input wall, to be emitted outwardly. The reflection structures are configured to enable the light beams, which are entering the main body through the second light input wall, to be reflected and to be emitted outwardly from the light output structures; wherein the light beams emitted outwardly from two of the light output structures disposed adjacent to each other are mutually staggered with each other.

The advantage of the present disclosure is that the optical element and the vehicle lamp of the present disclosure can emit uniform light beams through the structural design of the light output structure and the reflection structure.

For further understanding of the present disclosure, the following embodiments are provided along with illustrations to facilitate the disclosure of the present disclosure.

DETAILED DESCRIPTION OF PREFERRED EMBODIMENTS

The aforementioned illustrations and following detailed descriptions are exemplary for the purpose of further explaining the scope of the instant disclosure. Other objectives and advantages related to the instant disclosure will be illustrated in the subsequent descriptions and appended drawings. In addition, for an easy instruction, similar reference numbers or symbols refer to elements alike.

Figure 3:
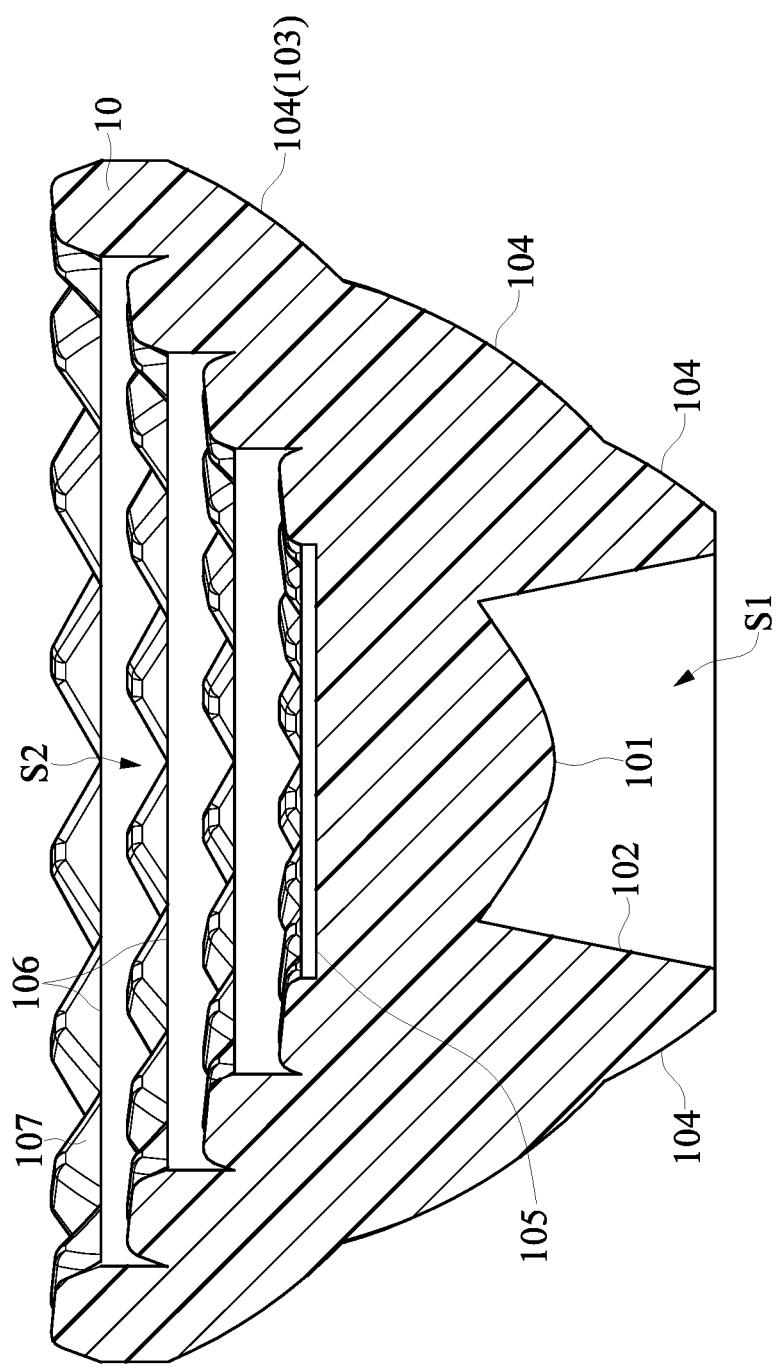
FIG. 3 is a cross-sectional view taken along a cross-sectional line of FIG. 1.
Figure 4:
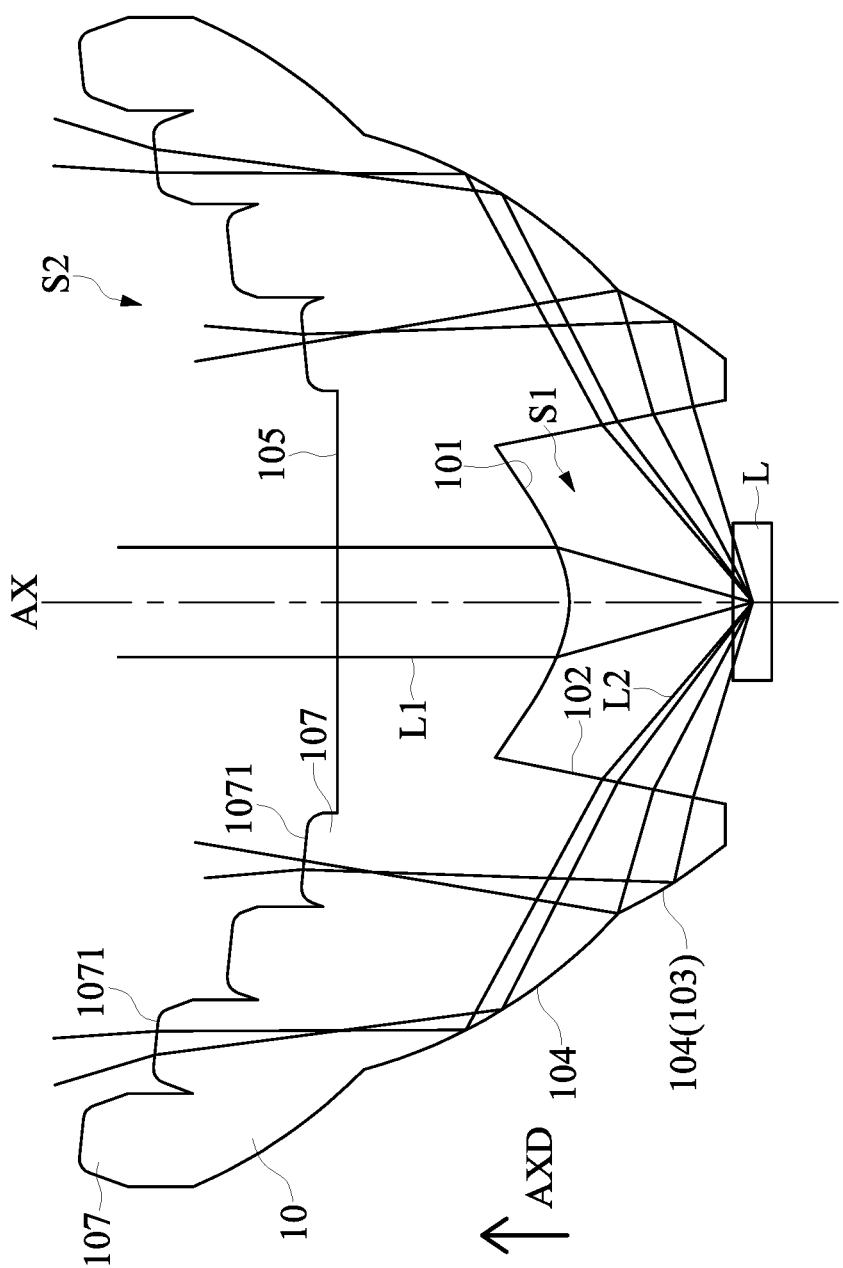
FIG. 4 is a schematic view showing light beam paths of light beams emitted from a light emitting unit and passing through the optical element according to the first embodiment of the present disclosure.

Reference is made to FIGS. 1 to 4, which are schematic views showing an optical element according to a first embodiment of the present disclosure. The optical element 10 includes a main body 10 and a plurality of reflection structures 104. Two opposite ends of the main body 10 are respectively defined as a light input end E1 and a light output end E2. The light input end E1 has a groove S1 recessing toward the light output end E2. Walls of the groove S1 are respectively defined as a first light input wall 101 and a second light input wall 102, and the second light input wall 102 is disposed around a periphery of the first light input wall 101. Referring to FIG. 4, when a light emitting unit L is disposed in the groove S1, light beams L1, L2 emitted from the light emitting unit L are entering the main body 10 through the first light input wall 101 and the second light input wall 102. In practical applications, outer diameters of the main body 10 are gradually decreased from the light output end E2 to the light input end E1 so that the main body 10 is in a truncated-cone shape. The groove S1 is substantially also in a truncated-cone shape. Referring to FIG. 3, a cross section of the first light input wall 101 is in an arc shape protruding from the light output end E2 toward the light input end E1, but the present disclosure is not limited thereto.

The main body 10 has a total reflection surface 103 located between the light output end E2 and the light input end E1. The total reflection surface 103 is configured to totally reflect a part of the light beams, which are entering the main body 10 through the second light input wall 102, so that the part of the light beams are emitted outwardly from the light output end E2. The reflection structures 104 are disposed on the main body 10, and the reflection structures 104 are correspondingly located on the total reflection surface 103. In practical applications, the reflection structures 104 and the main body 10 are integrally formed with each other. In particular, in the present embodiment, the reflection structures 104 and the main body 10 are integrally formed with each other, and the reflection structures 104 are fully distributed on the total reflection surface 103. Therefore, the positions indicated by the reference numeral 104 cover the total reflection surface 103 in the Figs of the present embodiment.

Referring to FIG. 4, two of the reflection structures 104 disposed adjacent to each other are configured to totally reflect the other part of the light beams, which are entering the main body 10 through the second light input wall 102, so that the other part of the light beams are mutually staggered with each other and are emitted outwardly from the light output end E2. Therefore, the uniformity of the light beams emitted outwardly from the light output end E2 can be increased. The shape of the reflection structures 104 may be varied according to practical needs, and is not limited to those shown in the Figs. Any structure that can totally reflect the light beams entering the main body 10 (especially for the light beams entering the main body 10 through the second light input wall 102) and can enable the light beams to be staggered with each other in the main body 10 belongs to the protected scope of the reflection structures 104 of the present disclosure.

Figure 8:
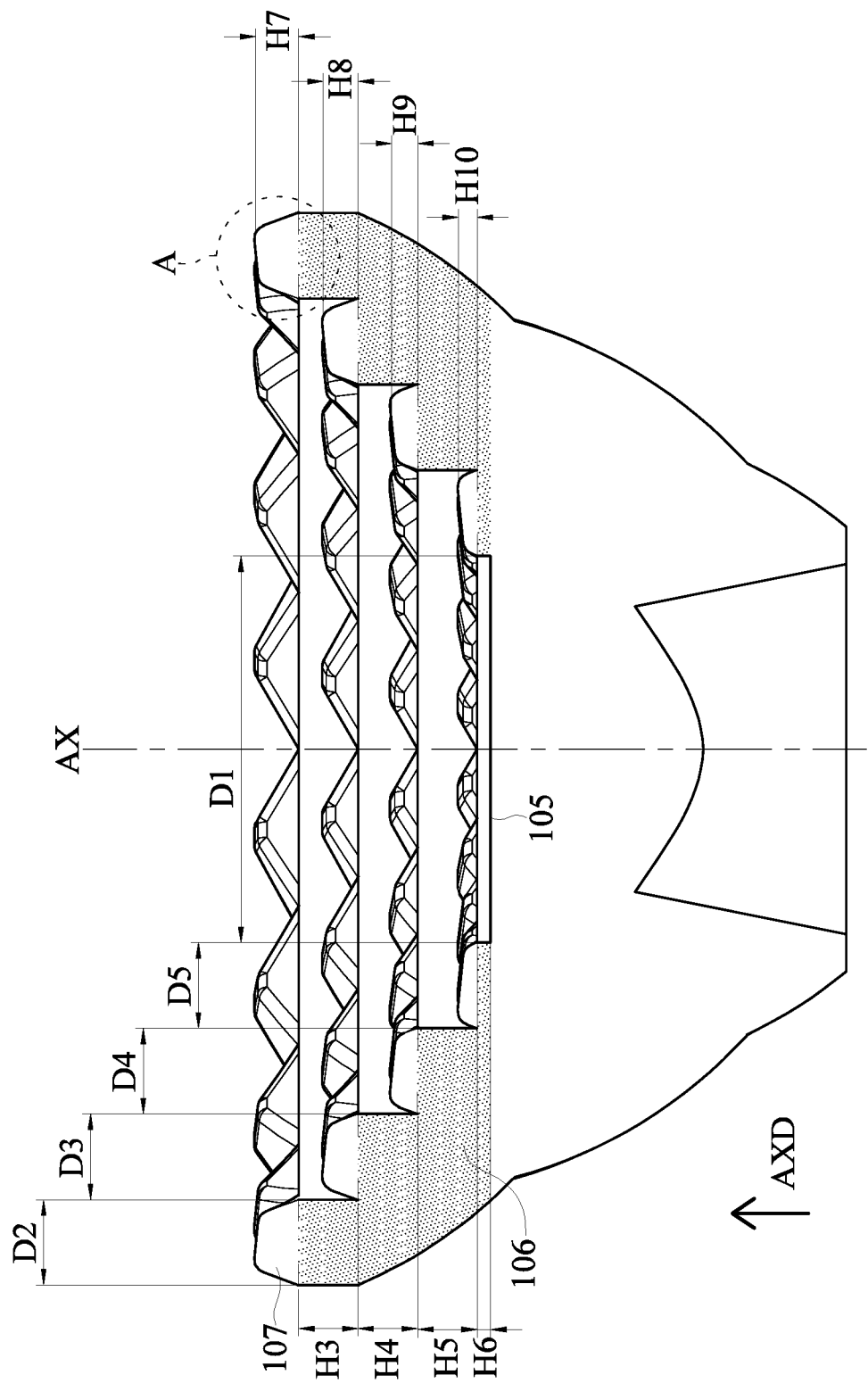
FIG. 8 is a cross-sectional view taken along a cross-sectional line of FIG. 1.

The main body 10 has a light output groove S2 recessed on the light output end E2, a bottom of the light output groove S2 is defined as a first light output portion 105, and a portion of the light output groove S2 surrounding the first light output portion 105 is defined as a second light output portion 106. The position of the first light output portion 105 is substantially corresponding to the position of the first light input wall 101. The first light output portion 105 is configured to enable most of the light beams L1, which are entering the main body 10 through the first light input wall 101, to be emitted outwardly. In practical applications, a radial width (D1 as indicated in FIG. 8) of the first light output portion 105 is greater than or equal to a radial width (such as diameter) of the first light input wall 101, and a cross section of the first light output portion 105 is in a flattened shape, but the present disclosure is not limited thereto. In a specific embodiment of the present disclosure, the radial width of the first light output portion 105, the radial width of the first light input wall 101, the shape of the first light input wall 101, and the light beam paths of the light beams emitted from the light emitting unit L, can be designed to cooperate with each other so that the light beams, which are emitted from the light emitting unit L disposed in the groove S1 and are substantially parallel to an optical axis AX, can enter the main body 10 through the first light input wall 101, and can be emitted outwardly from the first light output portion 105 substantially parallel to the optical axis AX.

Figure 5:
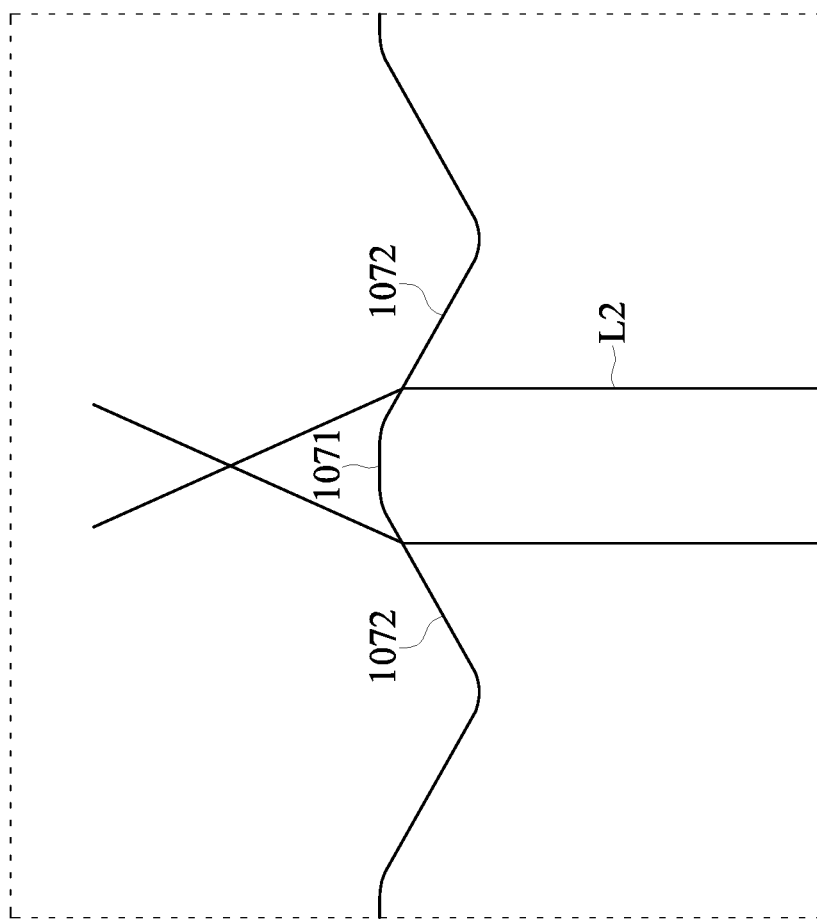
FIG. 5 is a schematic view showing light beam paths of light beams emitted from a light emitting unit and passing through light output structures of the optical element according to the first embodiment of the present disclosure.

The second light output portion 106 is in a stair-like structure having a plurality of stairs (as shown in the dotted area of FIG. 8), a stair surface of each of the stairs of the stair-like structure includes a plurality of light output structures 107, and each of the light output structures 107 is in a truncated-cone shape (will be detailed below). Referring to FIG. 5, the light beams emitted outwardly from each of the light output structures 107 are mutually staggered with each other. Therefore, the uniformity of the light beams emitted outwardly from the main body 10 can be increased. It is worth mentioning that the light beams emitted outwardly from two of the light output structures 107 disposed adjacent to each other are also mutually staggered with each other so as to further increase the uniformity of the light beams emitted outwardly from the main body 10. In various embodiments, the number of the stairs of the second light output portion 106 which is in a stair-like structure can be increased or decreased according to the volume of the optical element 1 and the volume of the light emitting unit L.

Accordingly, the optical element 1 of the present disclosure can greatly improve the uniformity of the light beams emitted from the main body 10 through the structural design of the reflection structures 104 and the light output structures 107. The optical element 1 of the present disclosure can be applied to a vehicle lamp, especially to a head lamp, so that the drawbacks of the uneven light beams emitted from the conventional vehicle lamps can be greatly improved.

Figure 6:
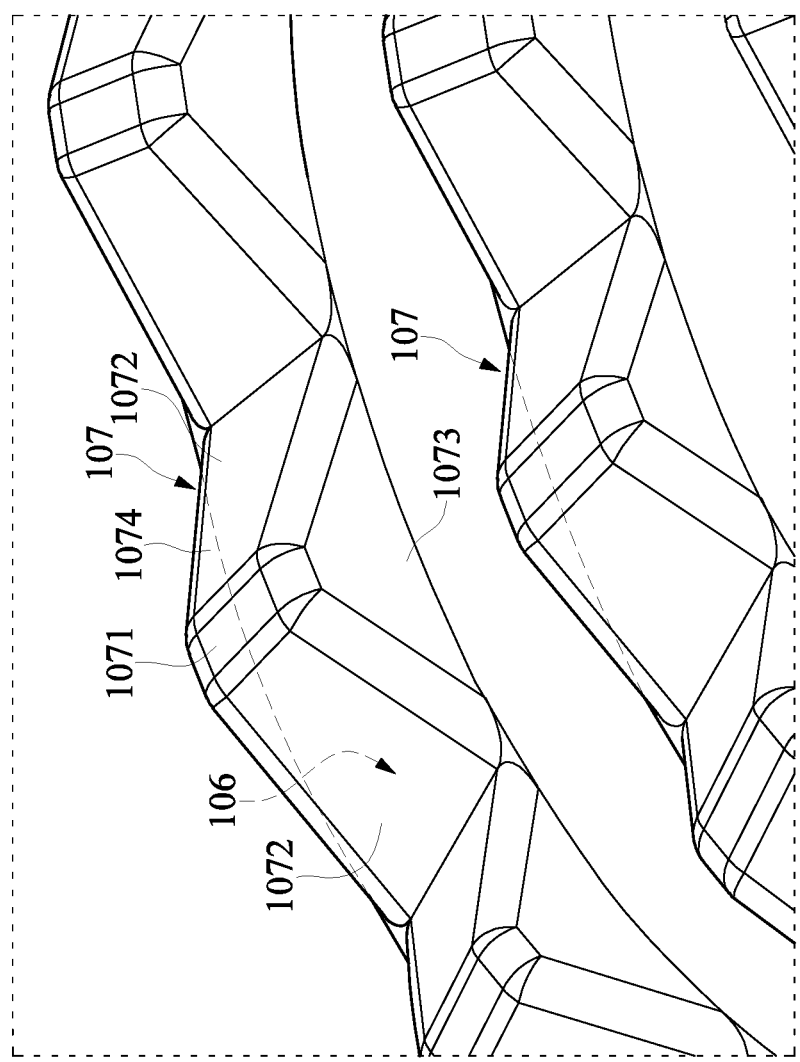
FIG. 6 is a partial enlarged view showing the light output structures according to the first embodiment of the present disclosure.

Referring to FIGS. 6 to 8A, a specific embodiment of the second light output portion 106 and the light output structure 107 will be described below, but the present disclosure is not limited thereto. Referring to FIG. 6, each of the light output structures 107, which is in a truncated-cone shape, has a top light output surface 1071, two side light output surfaces 1072, an inner light output surface 1073 and an outer light output surface 1074. The top light output surface 1071 is a light output surface of the light output structure 107 farthest away from the main body 10. The top light output surface 1071 and the stairs of the second light output portion 106 are facing each other. The two side light output surfaces 1072 are respectively disposed on two opposite sides of the light output structure 107, and the light output surfaces facing each other of two of the light output structures 107 disposed adjacent to each other are respectively defined as the side light output surfaces 1072. The inner light output surface 1073 is a light output surface of the light output structure 107 closest to the optical axis AX of the main body 10. The outer light output surface 1074 is a light output surface of the light output structure 107 disposed opposite to the inner light output surface 1073.

It is worth mentioning that, in practical applications, the light beams passing through the two side light output surfaces 1072, the inner light output surface 1073 and the outer light output surface 1074 of each of the light output structures 107 are guided to be emitted outwardly from the top light output surface 1071. In addition, in each of the light output structures 107, the positions of the top light output surface 1071 respectively connected to the two side light output surfaces 1072, the inner light output surface 1073 and the outer light output surface 1074, are in arc-guiding structures so as to facilitate the production of the light output structures 107.

Figure 1:
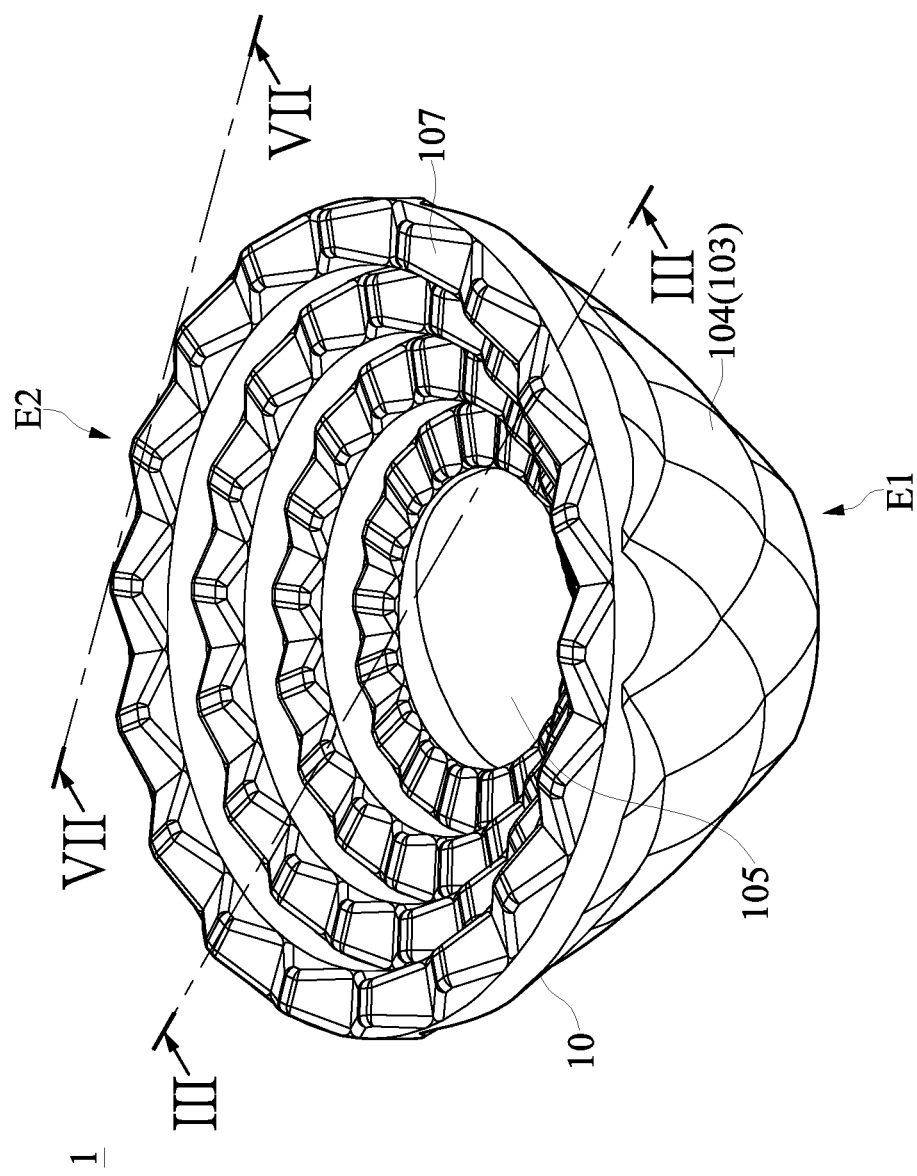
FIG. 1 is a perspective view showing an optical element according to a first embodiment of the present disclosure.
Figure 2:
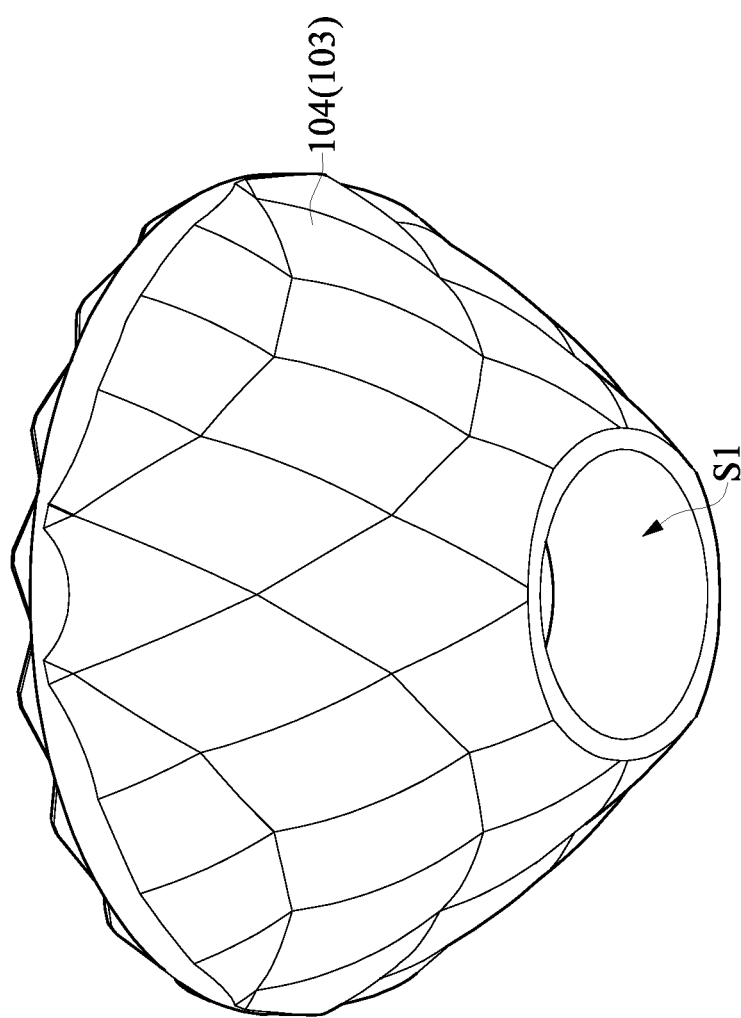
FIG. 2 is a perspective view showing another viewing angle of the optical element according to the first embodiment of the present disclosure.
Figure 7:
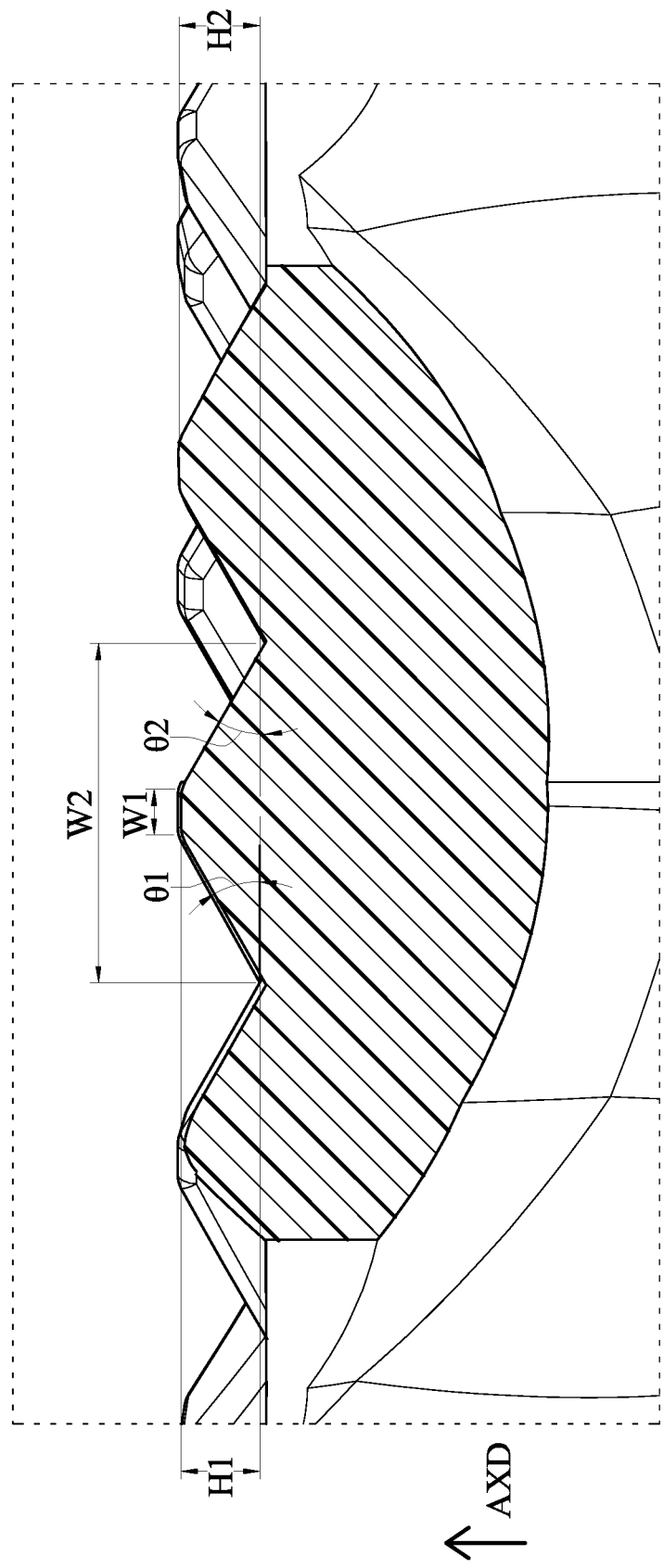
FIG. 7 is a cross-sectional view taken along a cross-sectional line VII-VII of FIG. 1.

Referring to FIG. 7, a cross-sectional view taken along a cross-sectional line VII-VII of FIG. 1 is shown. Two angles $\theta 1$, $\theta 2$ respectively formed by the two side light output surfaces 1072 of each of the light output structures 107 and a horizontal line are the same. For example, the two angles $\theta 1$, $\theta 2$ are within a range of 25 to 35 degrees. The ratio of the width W1 of the top light output surface 1071 of each of the light output structures 107 to the width W2 of the bottom portion thereof is substantially within a range of 1:7 to 1:7.5. The heights H1, H2 of the light output structures 107 formed on the same stair surface are the same.

Referring to FIG. 8, in a preferred embodiment, the heights (stair depth) H3, H4, H5 of most of the stairs of the second light output portion 106, which is in a stair-like structure, along an optical axis direction AXD are equal to each other. In the present embodiment, the height H6 of the stair closest to the first light output portion 105 is smaller than the heights H3, H4, H5 of the other stairs, but the present disclosure is not limited thereto. In various embodiments, the heights of all of the stairs (step depth) can be the same, or the heights of all of the stairs can be different.

The widths D2, D3, D4, D5 of the stair surfaces of the stairs are the same. In contrast, the width of the light output structure 107 formed on each of the stairs is substantially the same as the width D2, D3, D4, D5 of the corresponding stair surface. The light output structures 107 formed on different stairs have different heights from each other along the optical axis direction AXD, and the light output structures 107 closer to the optical axis AX have the smaller heights along the optical axis direction AXD. In practical applications, the heights H7, H8, H9, H10 of the light output structures 107 are in a relationship of an arithmetic progression. For example, the height H8 of the light output structure 107 further away from the optical axis AX is 0.8 times the height H7 of the light output structure 107 furthest away from the optical axis AX; and the height H9 of the light output structure 107 closer to the optical axis AX is 0.7 times the height H8 of the light output structure 107 further away from the optical axis AX, and the rest may be deduced by analogy.

Figure 8A:
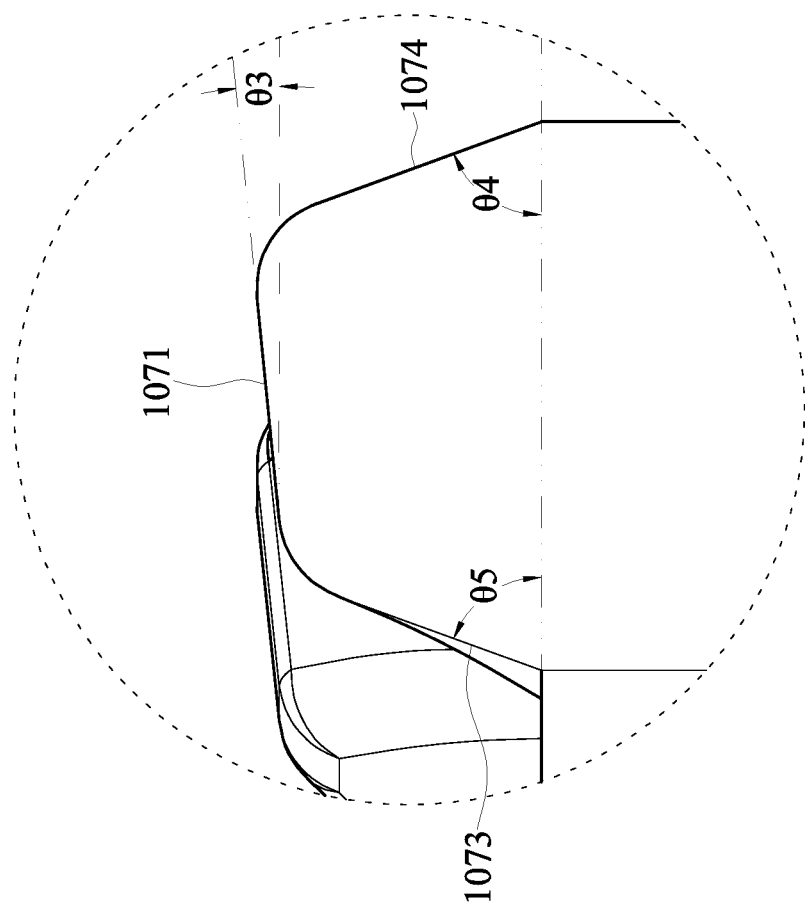
FIG. 8A is a partial enlarged view from a region A of FIG. 8.

Referring to FIGS. 8 and 8A, in each of the light output structures 107, the top light output surface 1071 is inclined toward the optical axis AX of the optical element 1. For example, an angle $\theta 3$ between the top light output surface 1071 and the horizontal line is within a range of 5 to 10 degrees. In addition, an angle $\theta 5$ between the inner light output surface 1073 and the horizontal line is the same as an angle $\theta 4$ between the outer light output surface 1074 and the horizontal line. For example, the angle $\theta 5$ between the inner light output surface 1073 and the horizontal line is within a range of 60 to 80 degrees, and the angle $\theta 4$ between the outer light output surface 1074 and the horizontal line is within a range of 60 to 80 degrees.

Figure 9:
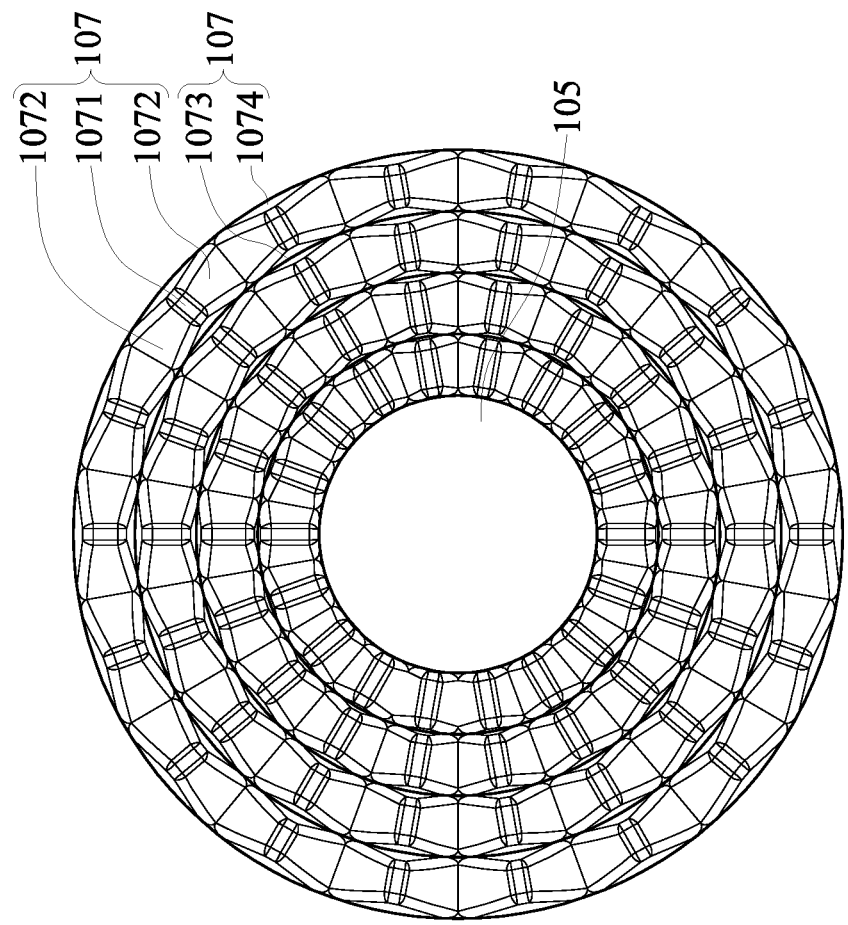
FIG. 9 is a top view of the optical element according to the first embodiment of the present disclosure.

Referring to FIGS. 1, 8, and 9, FIG. 9 is a top view of the optical element 1. The light output structures 107 formed on the same stair substantially have the same shape, and the light output structures 107 formed on the adjacent stairs are substantially enlarged or reduced according to a predetermined ratio. Referring to FIG. 9, the light output structures 107 are radially arranged in the top view of the optical element 1.

Figure 10:
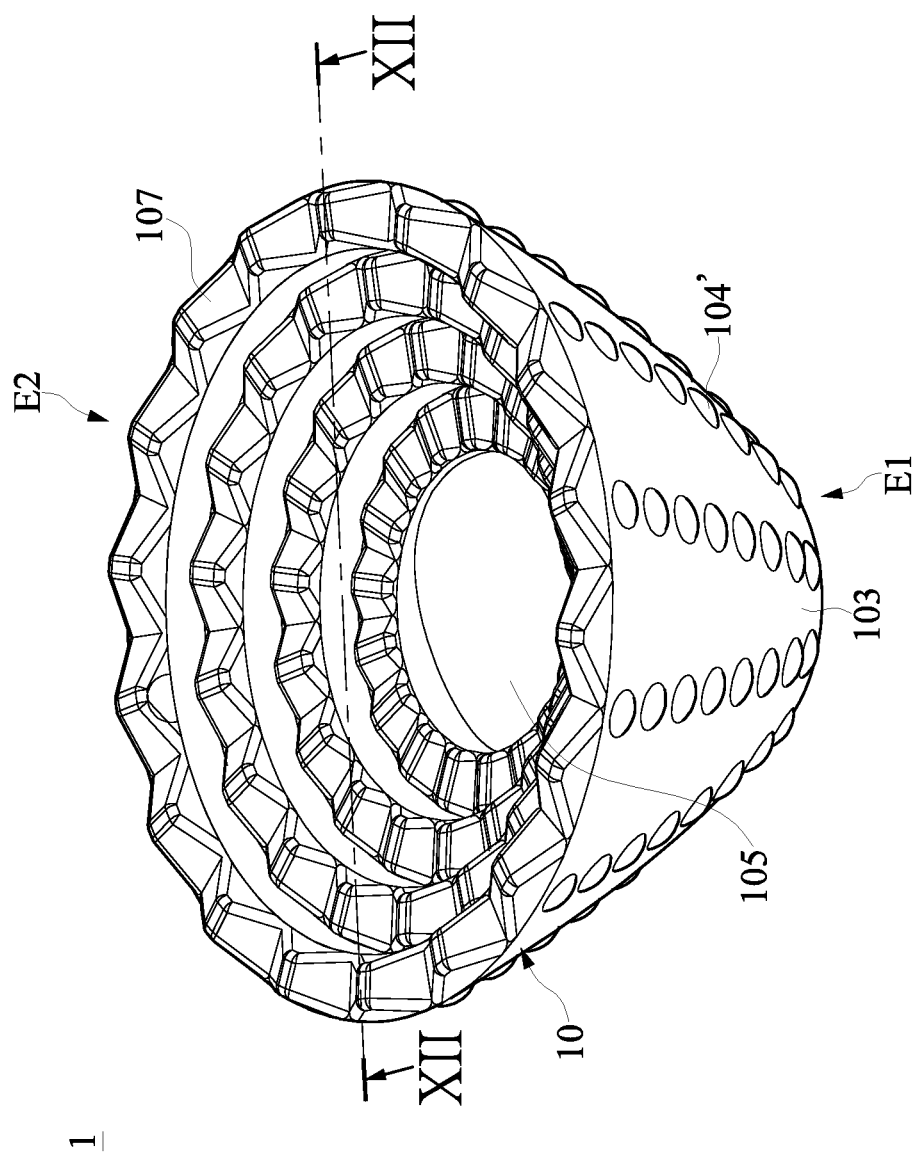
FIG. 10 is a perspective view showing an optical element according to a second embodiment of the present disclosure.
Figure 11:
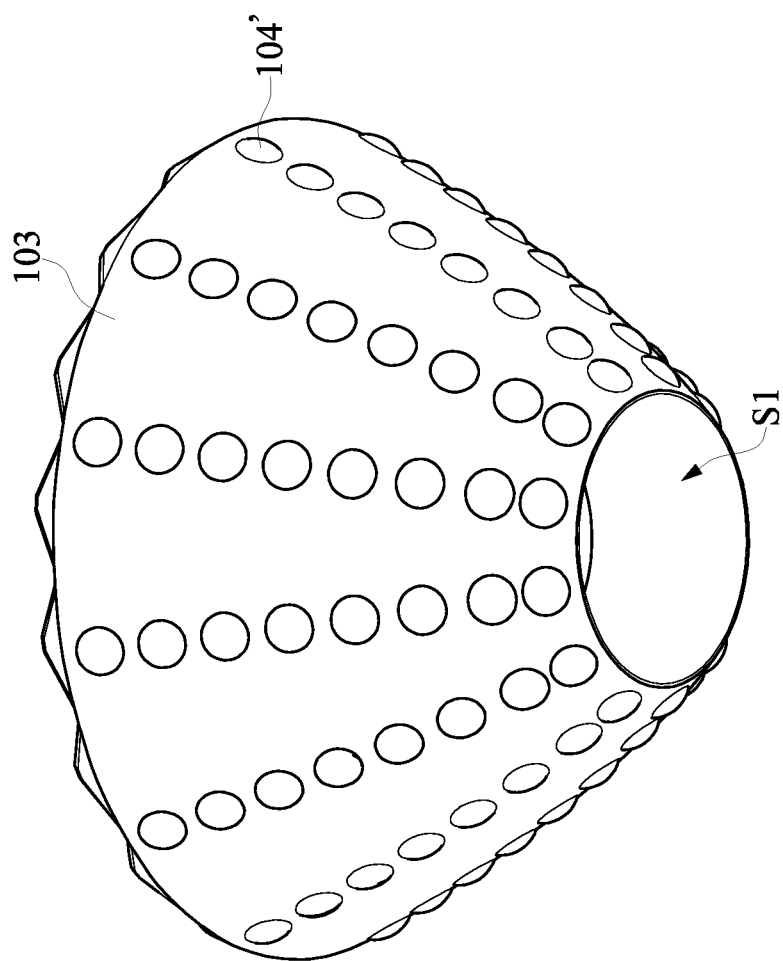
FIG. 11 is a perspective view showing another viewing angle of the optical element according to the second embodiment of the present disclosure.
Figure 12:
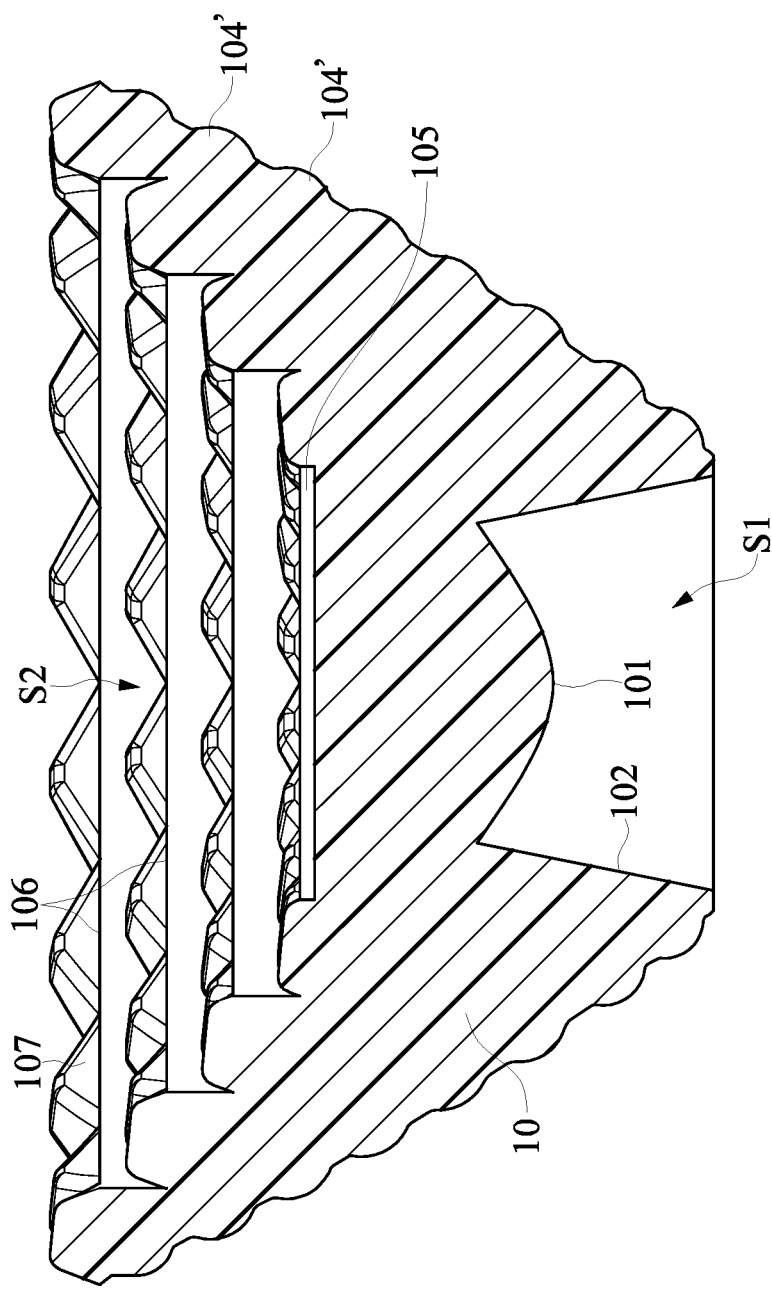
FIG. 12 is a cross-sectional view taken along a cross-sectional line XII-XII of FIG. 10.

Referring to FIGS. 10 to 12, perspective views of an optical element according to a second embodiment of the present disclosure are shown. The main difference between the first embodiment and the second embodiment is that, in the first embodiment, the reflection structures 104 are fully distributed on the total reflection surface 103, but in the second embodiment, the reflection structures 104' are not fully distributed on the total reflection surface 103, and the reflection structures 104' are in the arc shape protruding away from the total reflection surface 103. In other words, the reflection structures 104' of the second embodiment can achieve the same effect as the reflection structures 104 of the first embodiment can do. That is, the light beams entering the main body through the second light input wall can be totally reflected by the reflection structures 104', and can be mutually staggered with each other. The detailed description of the other structures of the optical element 1 of the second embodiment is the same as that of the first embodiment, and will not be described in detail herein.

The present disclosure also provides a vehicle lamp. The vehicle lamp includes the optical element 1 and the light emitting unit L as described above. The relationship between the optical element 1 and the light emitting unit L has already been described above, and will not be described in detail herein. Other components of the vehicle lamp, for example, a supporting component for fixing the optical element 1 and the light emitting unit L, can be designed according to practical needs, and the present disclosure is not limited thereto. The vehicle lamp of the present disclosure can emit uniform light beams through the optical element 1.

The descriptions illustrated supra set two simply the preferred embodiment of the present disclosure; however, the characteristics of the present disclosure are by no means restricted thereto. All changes, alterations, or modifications conveniently considered by those skilled in the art are deemed to be encompassed within the scope of the present disclosure delineated by the following claims.

What is claimed is:

1. An optical element, comprising a main body and a plurality of reflection structures, two opposite ends of the main body being respectively defined as a light input end and a light output end, the light input end having a groove recessing toward the light output end, walls of the groove being defined as a first light input wall and a second light input wall, and the second light input wall being disposed around a periphery of the first light input wall;

wherein when a light emitting unit is disposed in the groove, light beams emitted from the light emitting unit are entering the main body through the first light input wall and the second light input wall, and are emitted outwardly from the light output end of the main body;

wherein the main body has a total reflection surface located between the light input end and the light output end, the reflection structures are disposed on the main body, and the reflection structures are correspondingly located on the total reflection surface; two of the reflection structures disposed adjacent to each other are configured to totally reflect a part of the light beams, which are entering the main body through the second light input wall, so that the part of the light beams are mutually staggered with each other; the total reflection surface is configured to totally reflect the other part of the light beams, which are entering the main body through the second light input wall, so that the other part of the light beams are emitted outwardly from the light output end;

wherein the main body has a light output groove recessed on the light output end, a bottom of the light output groove is defined as a first light output portion, a portion of the light output groove surrounding the first light output portion is defined as a second light output portion, the second light output portion includes a plurality of light output structures, and each of the light output structures is in a truncated-cone shape;

wherein the first light output portion is configured to enable the light beams, which are entering the main body through the first light input wall, to be emitted outwardly; the reflection structures are configured to enable the light beams, which are entering the main body through the second light input wall, to be reflected and to be emitted outwardly from the light output structures; wherein the light beams emitted outwardly from two of the light output structures disposed adjacent to each other are mutually staggered with each other, wherein each of the light output structures has a top light output surface, two side light output surfaces, an inner light output surface and an outer light output surface; the top light output surface is inclined toward the optical axis of the optical element; the two side light output surfaces are respectively disposed on two opposite sides of the light output structure, the light output surfaces facing each other of two of the light output structures disposed adjacent to each other are respectively defined as the side light output surfaces, the inner light output surface and the outer light output surface are respectively disposed on the other two opposite sides of the light output structure; a light output surface of the light output structure adjacent to the optical axis is defined as the inner light output surface, and the light beams passing through the two side light output surfaces, the inner light output surface and the other light output surface of each of the light output structures are guided to be emitted outwardly from the top light output surface.

2. The optical element according to claim 1, wherein diameters of the main body are gradually decreased from the light output end to the light input end; a light input surface of the first light input wall is in an arc shape protruding away from the light output end; a light output surface of the first light output portion is in a flattened shape; and a radial width of the light output surface of the first light output portion is greater than or equal to a radial width of the light input surface of the first light input wall.

3. The optical element according to claim 1, wherein the second light output portion is in a stair-like structure having a plurality of stairs, a stair surface of each of the stairs of the stair-like structure includes the light output structures, and the light output structures of each of the stairs have the same shape.

4. The optical element according to claim 1, wherein the reflection structures are fully distributed on the total reflection surface.

5. The optical element according to claim 1, wherein two angles respectively formed by the two side light output surfaces of each of the light output structures and a horizontal line are the same; and an angle between the inner light output surface and the horizontal line is the same as an angle between the outer light output surface and the horizontal line.

6. The optical element according to claim 3, wherein at least part of the stairs have the same stair depth, the light output structures formed on different stairs have different heights from each other along an optical axis direction, and the optical axis direction is parallel to an optical axis of the optical element.

7. The optical element according to claim 6, wherein each of the light output structures formed on different stairs has a height different from each other along the optical axis direction, and the light output structures closer to the optical axis have the smaller heights along the optical axis direction.

8. The optical element according to claim 5, wherein an angle between the top light output surface and the horizontal line is within a range of 5 to 10 degrees; the angle between the inner light output surface and the horizontal line is within a range of 60 to 80 degrees; and the angle between the outer light output surface and the horizontal line is within a range of 60 to 80 degrees.

9. A vehicle lamp, comprising:
a light emitting unit capable of being controlled to emit light beams; and
an optical element, comprising a main body and a plurality of reflection structures, two opposite ends of the main body being respectively defined as a light input end and a light output end, the light input end having a groove recessing toward the light output end, walls of the groove being defined as a first light input wall and a second light input wall, and the second light input wall being disposed around a periphery of the first light input wall;

wherein when the light emitting unit is disposed in the groove, the light beams emitted from the light emitting unit are entering the main body through the first light input wall and the second light input wall, and are emitted outwardly from the light output end of the main body;

wherein the main body has a total reflection surface located between the light input end and the light output end, the reflection structures are disposed on the main body, and the reflection structures are correspondingly located on the total reflection surface; two of the reflection structures disposed adjacent to each other are configured to totally reflect a part of the light beams, which are entering the main body through the second light input wall, so that the part of the light beams are mutually staggered with each other; the total reflection surface is configured to totally reflect the other part of the light beams, which are entering the main body through the second light input wall, so that the other part of the light beams are emitted outwardly from the light output end;

wherein the main body has a light output groove recessed on the light output end, a bottom of the light output groove is defined as a first light output portion, a portion of the light output groove surrounding the first light output portion is defined as a second light output portion, the second light output portion includes a plurality of light output structures, and each of the light output structures is in a truncated-cone shape;

wherein the first light output portion is configured to enable the light beams, which are entering the main body through the first light input wall, to be emitted outwardly; the reflection structures are configured to enable the light beams, which are entering the main body through the second light input wall, to be reflected and to be emitted outwardly from the light output structures; wherein the light beams emitted outwardly from two of the light output structures disposed adjacent to each other are mutually staggered with each other;

wherein each of the light output structure has a top light output surface, two side light output surfaces, an inner light output surface and an outer light output surface; the top light output surface is inclined toward the optical axis of the optical element; the two side light output surfaces are respectively disposed on two opposite sides of the light output structure, the light output surfaces facing each other of two of the light output structures disposed adjacent to each other are respectively defined as the side light output surfaces; the inner light output surface and the outer light output surface are respectively disposed on the other two opposite sides of the light output structure; a light output surface of the light output structure adjacent to the optical axis is defined as the inner light output surface; and the light beams passing through the two side light output surfaces, the inner light output surface and the other light output surface of each of the light output structures are guided to be emitted outwardly from the top light output surface.

* * * * *